Aug. 3, 1965   J. W. DARK   3,198,139
MONORAIL SYSTEMS

Filed Aug. 19, 1963   4 Sheets-Sheet 1

Aug. 3, 1965    J. W. DARK    3,198,139
MONORAIL SYSTEMS
Filed Aug. 19, 1963    4 Sheets-Sheet 2

INVENTOR:
John William Dark
BY Alexander Hoyell
ATTORNEYS

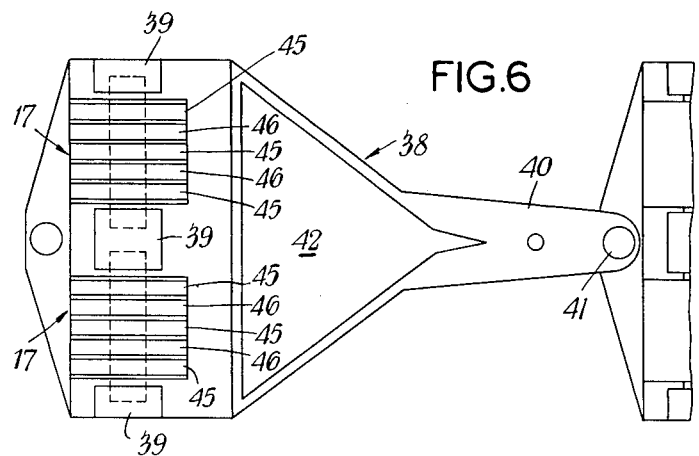
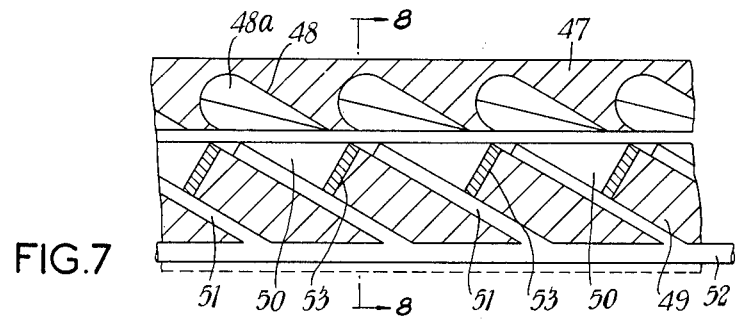
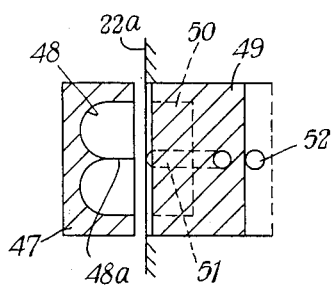

Aug. 3, 1965  J. W. DARK  3,198,139
MONORAIL SYSTEMS
Filed Aug. 19, 1963  4 Sheets-Sheet 4

United States Patent Office 3,198,139
Patented Aug. 3, 1965

3,198,139
MONORAIL SYSTEMS
John William Dark, 41 Criffel Ave.,
London SW. 2, England
Filed Aug. 19, 1963, Ser. No. 302,813
Claims priority, application Great Britain, Sept. 14, 1962,
35,067/62; Oct. 1, 1962, 37,197/62
6 Claims. (Cl. 105—145)

The present invention relates to monorail systems in which a vehicle, conveniently termed a monocar, is supported upon, and driven along, a continuous rail in the form of a beam mounted on supporting pylons spaced lengthwise of the beam. The beam is usually formed of reinforced concrete and the monocar is driven along the beam by means of driving wheels engaging the top surface of the beam while being maintained in lateral equilibrium by stabilising wheels engaging each side surface of the beam.

In a modern monorail installation the beam is relatively massive and may have, for example, a width of some 3 feet and a depth of some 5 feet. The monocar includes a superstructure which may be about 50 feet long, ten feet wide and eight feet high, carried upon a steel underframe which is itself slug between two truck assemblies, each having a large pneumatic tired driving wheel engaging the top surface of the beam and an electric motor or electric motors for driving the wheels.

The underframe also carries, one to each side, a relatively massive box-like construction termed the side apron. The aprons house a plurality of horizontal wheels which are rotatable about vertical axes and which are arranged to press against the side walls of the beam to provide lateral stability to the monocar.

With the above described design of monocar the truck assemblies protrude above the useful floor level of the superstructure thereby occupying a part of the possible passenger or load space. This is a disadvantage of considerable importance since the payload space is unnecessarily restricted and the motor and driving wheel assemblies constitute a considerable part of the total weight of the monocar, and their raised position relative to the floor level unnecessarily lifts the centre of gravity of the monocar.

A further disadvantage of such known monorail installations stems from the need of good frictional engagement between the driving wheels and the upper surface of the beam so that under severe snow or icing conditions effective driving engagement of the drive wheels with the beam is practically impossible.

It is an object of the invention to overcome or at least to minimise to a large extent the aforementioned disadvantages; and according to the invention there is provided a monorail system in which a monocar is supported upon and driven along a track beam wherein the monocar is freely movably supported on the upper surface of the track beam and is propelled along the beam by reaction forces produced between means carried by the monocar and co-operating means on the side walls of the track beam.

In a first embodiment of the invention, the monocar is supported on the upper surface of the beam by a plurality of pairs of relatively small diameter freely rotatable wheels or rollers of relatively small diameter positioned in spaced relation lengthwise of the monocar, and the propelling means comprises drive wheels mounted on the monocar and urged into engagement with friction surfaces on the side walls of the beam. It is desirable that the friction between the wheels or rollers and the top of the beam should be as low as possible and to this end the wheels or rollers may be formed of, or include tires formed of, a suitable anti-friction plastic such as nylon. In addition, the upper surface of the beam may be covered by such plastic in sheet form, and the monocar may be provided with means for ejecting water or other liquid onto the upper surface of the beam to still further decrease the friction between the supporting wheels or rollers and the beam.

In a second embodiment of the invention, the monocar is again supported on the upper surface of the beam by wheels or rollers and is propelled along the beam by jets of air or other gaseous medium which impinge on suitably shaped surfaces on the sides of the beam. Alternatively, the monocar may be propelled by linear electro induction by means of induction "stators" carried by the monocar and cooperating with induction "rotors" in the form of aluminium or copper strips extending lengthwise of the side walls of the beam.

The invention will now be described in further detail with reference to the accompanying drawings illustrating several embodiments thereof and in which:

FIGURE 6 is a plan view of the supporting rollers of FIG. 5;

FIGURE 7 is a section showing a modification of the construction of FIG. 4;

FIGURE 8 is a section taken along the line 8—8 of FIG. 7;

Figure 1:
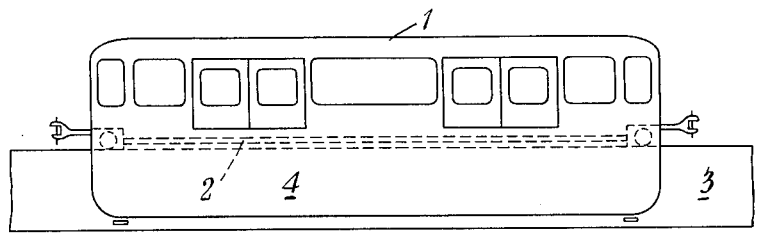
FIGURE 1 is a side elevation of a monocar and track beam suitable for carrying the present invention into effect.
Figure 2:
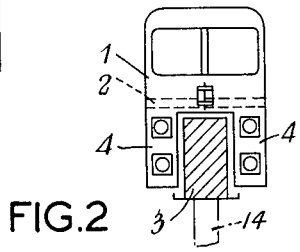
FIGURE 2 is an end view of the monocar of FIG. 1.

Referring first to FIGS. 1 and 2 which are intended to show the general exterior shape and arrangement of the monocar, it will be seen that the monocar comprises the car body or superstructure 1 of generally rectangular shape carried on an underframe 2 provided with means for movably supporting the car on the track beam 3 mounted on pylons 14. Depending from the underframe at each side of the track beam is an elongated box-like structure, hereinafter referred to as a side apron 4, which has clearance with the respective side wall of the beam. The side aprons 4 accommodate the driving means which react with the side walls of the beam to propel the car along the beam. The track beam is shown for convenience in FIGURE 2 as being of rectangular cross-section but as will hereinafter become apparent the beam may be of other cross sectional shapes for example of I cross-section.

Figure 3:
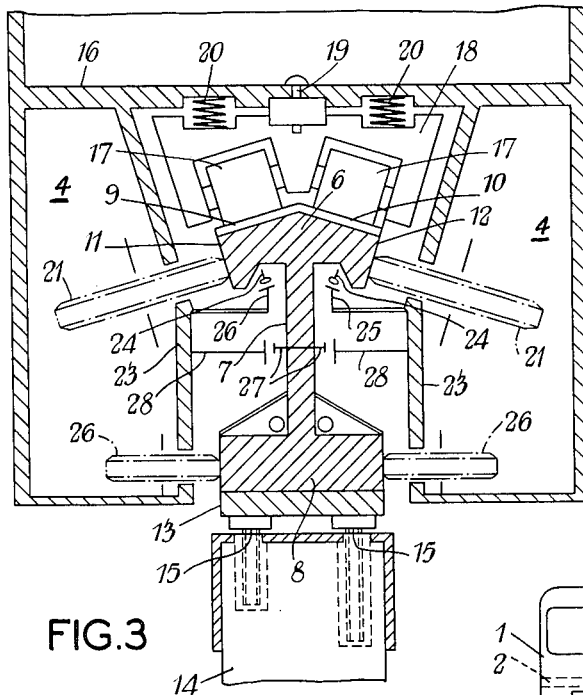
FIGURE 3 is a partial transverse sectional view of a monocar and track beam according to a first embodiment of the invention.

As shown in FIGURE 3 illustrating a first embodiment of the invention, the beam is of substantially I cross-section having an upper flange 6, a vertical web 7 and a lower flange 8. The top surface of the upper flange slopes downwardly at each side of the longitudinal centre line to support two running tracks 9 and 10 formed of sheet plastic for example and disposed at an angle to one another and the side walls 11 and 12 of the upper flange extend at right angles to the respective running tracks.

The lower flange of the beam is of rectangular cross-section and has secured to its bottom surface a base plate 13 which is supported at the top of the pylon 14 by means of screw threaded members 15 disposed at each side of the beam and by means of which the beam can be tilted to one side or the other when required, i.e. over curved portions of the track, with slight adjustment both horizontally and vertically.

The underframe of the monocar is indicated at 16 and is supported on the running tracks by means of a plurality of pairs of rollers 17 spaced lengthwise of the monocar so that the load of the monocar is distributed evenly over the length thereof. Each pair of rollers 17 is supported in a roller frame 18 extending transversely of the underframe and pivotally connected thereto at its centre by a pivot 19, capable of slight lateral movement within the underframe. At each side of the pivot 19 there are provided springs 20 interposed between the underframe 16 and the roller frame 18. The rollers 17 are journalled in anti-friction bearings (not shown) for example ball or roller bearings and are thus freely rotatable and freely movably support the monocar on the track beam.

The monocar is driven along the beam by means of drive wheels 21 housed in the respective side aprons 4 and extending through the inside walls 23 thereof to engage the side walls 11 and 12 of the upper flange of the beam. Suitable means (not shown) are provided for biasing the wheels 21 into engagement with the beam and the wheels are driven by electric motors (not shown) housed in the respective side aprons. The power for operating the electric motors is derived from electric conductor rails 24 supported on the underside of the upper flange 6 and engaged by shoes diagrammatically shown at 25 and carried by each side apron 4. Conveniently, the drive wheels 21 are arranged in pairs, one on each side of the beam, and the wheels of each pair are connected across the top of the beam by a toggle lever or levers (not shown) operated by hydraulic or other fluid pressure means to engage the wheels with the beam at a predetermined pressure to suit the prevailing conditions such as speed and weather.

The monocar is stabilised with respect to the beam by means of stabilising wheels 26 journalled in each side apron 4 at the lower end thereof and extending through the inner walls 23 of the apron to engage the side walls of the lower flange 8 of the beam. The wheels 26 are freely rotatable and are spring loaded (not shown) into engagement with the flange 8.

Provision is made for the use of automatic signalling and to this end the web 7 of the beam supports at each side thereof a "pick-up" conductor 27 which is engaged by a feeler 28 extending from the respective side apron and connected to signalling apparatus (not shown) in the driving cab of the monocar.

The use of drive wheels described with reference to FIGURE 3 is suitable for speeds up to about 100 m.p.h. but if it is desired to exceed this speed it is preferred to employ reaction means between the side aprons and the beam for propelling the car. Such propulsion of the car may be effected by linear electro induction reaction between induction "stators" carried by the car which co-operate with induction "rotors" carried by the beam, or it may be effected by means of jets of air issuing from the side aprons and which impinge against suitably shaped surfaces on the beam to provide the required reaction therebetween.

Figure 4:
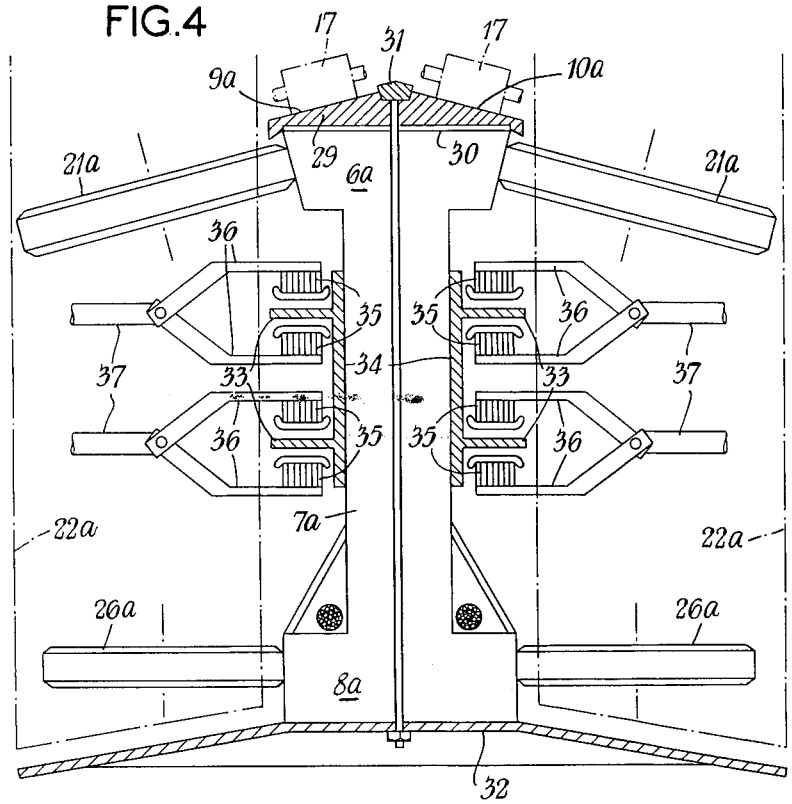
FIGURE 4 is a partial transverse somewhat diagrammatic sectional view of a track beam and cooperating elements of the monocar according to a second embodiment of the invention.

In FIGURE 4 there is shown a modification of the construction of FIGURE 3 in which electro-induction propelling means is provided in addition to the drive wheels. In FIGURE 4, the beam is also of modified construction in that the top surface of the upper flange 6a is flat and supports a plastic strip 29 of triangular cross-section to provide running tracks 9a and 10a upon which the rollers indicated in broken line at 17 run. A metallic sheeting 30 is interposed between the strip 29 and the upper flange 6a and a grounded rail 31 extends along the apex of the triangular section strip 29. The grounded rail is connected at intervals to a reaction flange plate 32 engaged against the under surface of the beam and which extends laterally underneath each side apron indicated in broken lines at 22a. The lateral extensions of the flange plate 32 are positioned closely adjacent the under surface of the side aprons 22a which under surface is of aero-foil section so that the slip stream of the car in movement creates an air cushion between the aero-foil section and the lateral extensions thereby exerting an upward force on the aprons which relieves the weight on the rollers 17 and still further decreases the friction between the rollers and the beam.

Drive wheels and stabilising wheels similar to those of FIGURE 3 are shown at 21a and 26a respectively but in the construction of FIGURE 4 the drive wheels 21a are retractable at will from engagement with the upper flange 6a.

The linear electro-induction propelling means comprises "rotors" in the form of pairs of flat copper or aluminum strips 33 extending horizontally from base plates 34 secured to the sides of the web 7a of the beam. The cooperating "stators" comprise field coils 35 supported on arms 36 extending outwardly through the wall of the respective side apron 22a. The coils 35 are arranged in pairs, the coils of each pair being positioned above and below a strip 33 and when energised, cooperating therewith to provide the required induction reaction to cause the car to be propelled along the track beam. The arms 36 of each pair of coils 35 are connected to an operating member 37 by means of which the coils are retractable within the respective side apron when not required for use. The coils are spring loaded (not shown) into close proximity with the corresponding rotor strips 33 there being provided means (not shown) for preventing physical contact between the coils and the strips. Such means may comprise mechanical stops which limit the movement of the coils towards the strips or preferably may comprise an air cushion formed between the coil and the strip by means of compressed air supplied through a pipe extending axially through each coil and connected with a compressed air supply in the respective side apron.

In the construction of FIGURE 4, the drive is effected initially by the drive wheels 21a (FIG. 4), the coils 35 being retracted. Upon the monocar reaching a predetermined speed, for example 100 m.p.h., the coils are extended to their operative position and energised whereupon the drive wheels may be retracted (by means not shown) and the car then propelled by electro induction reaction between the coils 35 and the rotor strips 33.

The grounded metallic sheeting 30 acts in conjunction with a suitable sensing device (not shown) carried by the monocar to detect any flaws or cracks in the plastic running strip 29 by sparking which takes place from the sensing device, through the crack in the plastic strip 29, to the sheeting 30.

Figure 5:
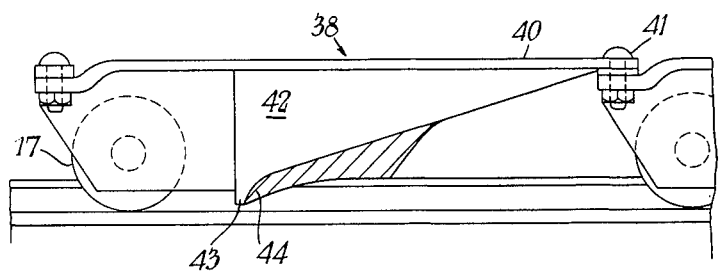
FIGURE 5 is a detail showing in side elevation one set of monocar supporting rollers of the embodiment of FIG. 4.

As shown in FIGURES 5 and 6, each pair of rollers 17 is supported in a bogie 38, each bogie being pivoted at one end to a succeeding bogie so that the assembled bogies form a flexible "spine" which enables the monocar to negotiate curves. Thus the bogie is provided at its forward end with bearings 39 for rotatably supporting the rollers 17, and an arm 40 extends rearwardly of the bogie to be pivotally connected as at 41 to the next succeeding bogie. The bogie is formed to provide intermediate in its length a tank 42 having an outlet 43 at the bottom adjacent the rollers 17. One wall of the outlet 43 is formed by a downwardly extending lip 44 which lies closely adjacent the running surface and acts to remove snow or other debris which may be on the running track. The tank 42 is adapted to contain cooling and/or lubricating liquid which is discharged onto the running track through the outlet 43.

As clearly shown in FIGURE 6, the rollers 17 are of laminated construction, each roller being formed by steel discs 45 and plastic discs 46 arranged alternately side by side.

The electro induction reaction propelling means of FIGURE 4 may be replaced by compressed air reaction means by substituting for the plates 34 carrying the rotor strips 33 slab-like members having formed therein suitably shaped cup-shaped recesses into which compressed air is directed from air nozzles suitably positioned on the side aprons. Thus as shown in FIGURES 7 and 8 a slab-like member 47 adapted to be secured to the side of the web 7a of the beam of FIGURE 4 is formed on its outwardly facing surface with a plurality of recesses 48 extending in succession lengthwise thereof. The recesses 48 are shaped after the manner of Pelton wheel cups.

Positioned in the side aprons 22a there are arranged further slab-like members 49 positioned opposite to the respective members 47 secured at each side of the beam web. The members 49 are formed with recesses 50 extending in succession lengthwise thereof and through which extend air discharge nozzles 51 connected to a compressed air supply pipe 52 connected to a compressed air supply in the side apron. As shown in FIGURE 8, the nozzles 51 are positioned vertically relative to the cup-like recesses 48 of the slab-like member 47 so as to be level with the dividing walls 48a in the recesses 48. The air discharged through the nozzles 51 is deflected by the upper and lower portions of each cup or recess 48 and impinges against suitably positioned reaction blocks 53 in the recesses 50 of the member 49 thereby producing the necessary reaction force on the side aprons to propel the monocar along the track beam.

Figure 9:
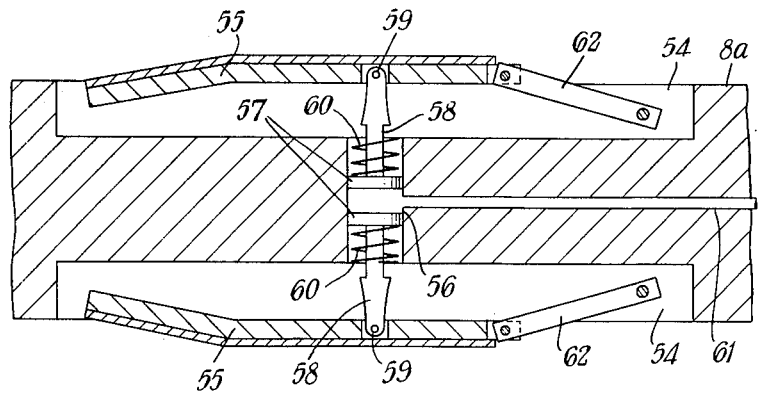
FIGURE 9 is a diagrammatic horizontal sectional view showing a braking means for incorporation into the track beam of FIG. 4.

FIGURE 9 is a horizontal section through the lower flange 8 of FIGURE 3 or 8a of FIGURE 4 showing one form of braking means for the monocar. As will be seen in FIGURE 9, the lower flange is formed with an elongated recess 54 extending inwardly from each side wall thereof and accommodating an elongated braking member or shoe 55. The recesses 54 are connected by a bore 56 extending through the material of the flange and which serves as a cylinder in each end of which is positioned a piston 57 having a piston rod 58 which is connected as at 59 to the respective braking member 55. The pistons 57 are spring loaded in a direction inwardly of the cylinder by springs 60 and can be forced outwardly by fluid pressure supplied to the cylinder 56 through a pipe 61. The braking members 55 may alternatively be operated by electric means (not shown).

The braking members 55 are hingedly secured at one end to the lower flange by means of pivoted links 62 and it will be apparent that the braking members will normally occupy a retracted position within the respective recesses 54 and can be urged outwardly of the recess to engage suitable braking surfaces (not shown) on the side aprons in order to apply a braking action to the monocar. It will be understood that the braking members will be positioned along the track beam at points where braking may be required and will be operated by remote control of the fluid pressure in the pipe 61.

Figure 10:
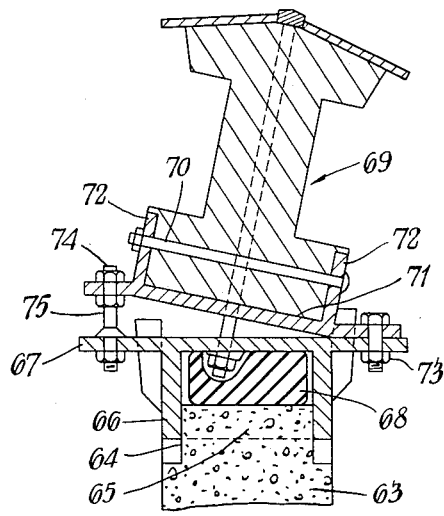
FIGURE 10 is a vertical sectional elevation of the upper part of a support column and a track beam mounted thereon and showing the manner in which the beam can be tilted to provide a required "camber" on curved portions of the track.

FIGURE 10 shows a preferred method of supporting the track beam on a pylon or column and illustrates the beam in a tilted postion required on a curved portion of the track. The upper end portion of the pylon or column is shown at 63 and is rebated from its upper end as at 64 to provide a top part 65 of reduced cross sectional area. A hollow boss 66 depending from a cap plate 67 sildingly engages over the top part 65 and a rubber cushion 68 is interposed between the under-surface of the cap plate and the upper end face of the column so that the cap plate is resiliently supported on the column.

The track beam indicated at 69 is of I-cross section and the lower flange thereof has secured thereto as by the bolt 70 a tilt plate 71 provided with upstanding webs 72 which engage each side of the lower flange of the beam and through which the tie bolt 70 passes. The tilt plate extends laterally outwardly from each side of the beam and the lateral extensions are bent in opposite directions i.e. upwardly and downwardly with respect to the plane of the tilt plate as shown in FIGURE 9 to enable the required tilt to be given to the beam. The upwardly bent lateral extension is secured directly to the cap plate 67 by a bolt 73 while the other lateral extension is supported spaced above the cap plate by means of a bolt 74 having a spacer portion 75 interposed between the cap plate and the lateral extension of the tilt plate. Where the beam is not required to be tilted, the tilt plate 71 is replaced by a beam plate which engages the beam in a similar manner to the tilt plate but which has lateral extensions which are not bent with respect to the remainder of the plate so that the beam plate rests squarely on the cap plate to be secured directly thereto.

In all the embodiments described, the elimination of driving wheels engaging the upper surface of the track beam avoids the needs for relatively massive track assemblies which project into the useful floor area of the superstructure thus making it possible to spread the live weight of the monocar more uniformly along the length thereof.

What I claim is:

1. A monocar system comprising a monocar, a track beam having a top surface and opposed side walls, said monocar being freely supported for movement along said track beam, and having a plurality of pairs of freely rotatable supporting rollers bearing upon the two running surfaces; and means for producing reaction forces between the side walls of the beam and cooperating means carried by the monocar to propel the monocar along the beam; said propelling means comprising electro-induction elements carried by the monocar reacting with electro-induction reaction elements on the side walls of the beam; said reaction elements carried by the beam comprising strips of conductive material extending along each side of the beam, and the elements carried by the monocar comprising field coils supported in close proximity to said strips.

2. In a system as set forth in claim 1, said field coils being electro-magnets supported above and below the strips in pairs, with the pole of one electro-magnet of the pair facing the other pole of the other electro-magnet of the pair, so that the strip is subjected to the magnetic flux induced between poles.

3. In a system as set forth in claim 1, said supporting rollers, being carried by bogies having means for storing a quantity of cooling and lubricating liquid, and having means for discharging said liquid onto the running surface.

4. In a system as set forth in claim 3, each bogie being formed in sections pivotally connected together, each section having bearings rotatably supporting said supporting rollers; said storing means comprising a liquid holding tank; and said discharging means comprising an outlet in the bottom or the tank extending transversely of the running surfaces.

5. In a system as set forth in claim 4, one wall of said outlet having a downwardly extending lip lying closely adjacent to the running surface and serving to remove snow and other debris from the running surface.

6. In a system as set forth in claim 1, said track beam being of I-shaped cross-section having an upper flange, a lower flange, and vertical web connecting said flanges; said lower flange being provided with recesses in the side walls thereof; braking members normally positioned within said recesses and movable to extended positions for engaging braking surfaces on the monocar, and remote-controlled means for shifting the braking members from their normal positions into their extended positions.

(References on following page)

References Cited by the Examiner

UNITED STATES PATENTS

| | | | |
|---|---|---|---|
| 206,738 | 8/78 | Leypoidt | 238—148 |
| 891,882 | 6/08 | Valentine | 105—145 |
| 1,020,943 | 3/12 | Bachelet. | |
| 1,074,185 | 9/13 | Lockwood | 104—66 |
| 1,128,910 | 2/15 | Simmons | 104—279 |
| 1,600,767 | 9/26 | Lockwood | 104—120 |
| 2,717,744 | 9/55 | Birnbaum | 104—23 X |
| 2,932,258 | 4/60 | Marquard | 104—120 |
| 2,985,114 | 5/61 | Linder | 105—141 |
| 2,987,013 | 6/61 | Rosenbaum | 105—145 |
| 3,077,165 | 2/63 | Vittorelli | 104—247 |
| 3,095,828 | 7/63 | Deller | 105—144 |
| 3,114,332 | 12/63 | Bacon et al. | 104—63 |

FOREIGN PATENTS 966,602   3/50   France.

ARTHUR L. LA POINT, *Primary Examiner.*

LEO QUACKENBUSH, EUGENE G. BOTZ, MILTON BUCHLER, *Examiners.*